United States Patent

[11] 3,573,760

[72] Inventors Hsu Chang
Yorktown Heights;
Kurt R. Grebe, Beacon, N.Y.
[21] Appl. No. 783,927
[22] Filed Dec. 16, 1968
[45] Patented Apr. 6, 1971
[73] Assignee International Business Machines Corporation
Armonk, N.Y.

[54] HIGH DENSITY THIN FILM MEMORY AND METHOD OF OPERATION
28 Claims, 9 Drawing Figs.

[52] U.S. Cl. 340/174
[51] Int. Cl. G11c 11/14
[50] Field of Search 340/174 (TF), 173

[56] References Cited
UNITED STATES PATENTS
3,456,247 7/1969 English 340/174
3,480,929 11/1969 Bergman 340/174

*Primary Examiner*—James W. Moffitt
*Attorneys*—Hanifin and Jancin and T. J. Kilgannon, Jr.

ABSTRACT: A multilayer, multithreshold magnetic film memory element is disclosed which consists of a number of superposed magnetic storage layers which share the same word and bit-sense lines. Operation of the element is essentially in the orthogonal drive mode and requires the application of different amplitude pulses on the word line to separately energize each of the storage films of the memory element. Thus, for readout of stored information, the amplitude of a succeeding read pulse increases relative to the amplitude of the preceding read pulse. Each ascending step in the read pulses provides sufficient magnetic field to overcome the rotational switching threshold of a storage film, but insufficient magnetic field to overcome the rotational switching threshold of the next storage film. For writing, each succeeding pulse after the initial pulse is lower in amplitude than the preceding pulse and is applied in coincidence with one bit pulse. Only one layer at a time is switched; the magnetization direction thereof being determined by the polarity of each bit pulse.

Several embodiments of a multilayer magnetic elements are shown all of which are capable of storing multiple bits of information at the intersection of a single word line and a single bit-sense line. The method of operating multilayer memory elements in conjunction with an array of these elements is also disclosed.

INVENTORS
HSU CHANG
KURT R. GREBE

BY Thomas J. Kilgannon Jr

ATTORNEY

PATENTED APR 6 1971 3,573,760

HIGH DENSITY THIN FILM MEMORY AND METHOD OF OPERATION

BACKGROUND OF THE INVENTION

1. Field of the Invention

This invention relates generally to magnetic thin film memories which are capable of storing information by switching the magnetization of magnetic films which have anisotropic characteristics. More specifically, it relates to a multilayer, multithreshold storage element which is capable of storing multiple bits of information at the intersection of a single word and bit line. The invention also relates to the method of writing information into and reading information out of such a memory element. The method and apparatus disclosed provides a high bit density magnetic memory using the same number of bit-sense lines as prior art arrangements without increasing the areal dimensions of an array of memory elements.

2. Description of the Prior Art

Devices which store information in various forms have been known for a number of years and include arrangements which incorporate thin magnetic films as storage devices. Because of the growth of computer technology and the increasing speed of computers, requirements have increased for information storage devices with both larger information storage capacity and higher data rate. Using more of the available storage devices was not a solution because of proportionately increased cost, space requirements, cooling and other factors. Size reduction to provide the same information has provided what may be characterized as an interim solution. Increasing the packing density of the storage element on planar arrays without further reduction in size has permitted further increases in memory capacity. The demand for greater capacity is, however, still on the increase and miniaturization techniques are being badly strained to provide even small increases in storage capacity. From the foregoing, it can be seen that the known techniques in the magnetic thin film area for increasing memory capacity have failed to provide a solution to the increased capacity requirements and that any solution which can meet this demand would be welcomed by the magnetic film memory art.

SUMMARY OF THE INVENTION

The apparatus of the present invention in its broadest aspect consists of a plurality of stacked films of magnetic materials, each of the stacked films having a different magnetic or physical characteristic from the other films. The magnetic characteristics may differ in kind from one film to another or may differ only in degree with respect to a given characteristic from one magnetic film to the next. With respect to the physical characteristics, these may differ in kind from one film to the next or may differ in the degree each film possesses a given characteristic. Orthogonally disposed conductors are disposed in magnetically coupled relationship with a stacked film memory element and the application of coincident pulses of appropriate amplitude and polarity actuates each of the films successively to store either a binary "one" or "zero." Detection of the condition of each of the films is accomplished by the application of pulses of appropriate amplitude to one of the conductors.

The method of the present invention in its broadest aspect consists of the application of at least a pulse of decreasing energy content to one of two orthogonally related conductors which are magnetically coupled to a stacked film memory element and applying simultaneously a train of pulses of equal amplitude and either positive or negative polarity to the other of the conductors to write information into each of the films of the memory element. The method also includes the step of applying via one of the orthogonally disposed conductors a pulse of increasing energy content to switch each of the films in turn to induce successive signals in the other of said conductors which are indicative of the binary state of each of the films of the stacked film memory element.

In a more specific aspect of the apparatus of the present invention, a number of embodiments are shown which include a plurality of magnetic thin film disposed symmetrically about a conductor in magnetically coupled relationship with it and with another orthogonally disposed conductor. Also included is an arrangement which shows a plurality of magnetic thin films disposed on one side of a conductor with a single magnetic film of thickness equal to the sum of the thickness of the plurality of thin magnetic films disposed on the opposite side of the conductor. The films are in magnetically coupled relationship with the conductor and with another orthogonally disposed conductor. In the foregoing embodiments, the films differ from each other by differences in their magnetic characteristics. Thus, the coercivity, the permeability or other magnetic characteristic may be controlled by adjusting the composition of the magnetic material from which the films are formed. In this manner, each of the films responds to different pulse amplitudes and information may be stored or read out. The films form a closed magnetic circuit either through a small air gap or via an edge closure of magnetic material which provides a low reluctance path for the magnetic flux. The films may be CHA (closed hard axis) or CEA (closed easy axis) films.

Other specific embodiments include film arrangements of different width and thickness disposed on one side of a conductor with a single film equal in cross-sectional are to the sum of the cross-sectional areas of all the films disposed on the other side of the conductor. Like the first two embodiments described, these arrangements may be closed at their film edges and may be CHA or CEA.

In the above embodiments, the magnetic and physical characteristics have been grouped separately, but there is no reason why these characteristics cannot be mixed in a single multiple film arrangement. Thus, a single magnetic element may contain films in which the characteristics are adjusted by composition and by thickness or width. The ability to use different parameters permits wider variation in magnetic characteristics and a greater degree of control.

More specific aspects of the method of the present invention include the steps of applying either sawtooth-shaped pulses, step-shaped pulses or a train of pulses, all decreasing in amplitude simultaneously with a train of positive or negative pulses (one for each film) to write information into each of a plurality of stacked magnetic films via orthogonally disposed conductors. Reading specifically requires a sawtooth-shaped pulse, a step-shaped pulse or a train of pulses, all of increasing amplitude applied via one of the conductors.

The apparatus and method of the present invention solves the problem of attaining high density storage of information without increasing the areal dimensions of known arrangements and without significantly increasing the amount of the ancillary electronics. Fabrication techniques do not markedly differ from known techniques and added flexibility in device characteristics may be obtained by simple adjustments during fabrication.

It is therefore an object of the present invention, to provide a magnetic thin film memory element which is capable of storing a plurality of bits of information at a single bit location.

Another object is to provide a high bit density magnetic film memory element which is simple, inexpensive and easy to fabricate.

Still another object is to provide a method of writing information into and reading information out of a stacked film memory element.

One more object is to provide a physical embodiment which allows high data rate per sense channel due to increased number of bits read out in one read cycle.

Yet another object is to provide a thin film memory array which has a higher density than prior art memories without increasing the areal dimensions of the memory array. Hence, the signal attenuation due to propagation in space is minimized.

The foregoing and other objects, features and advantages of the invention will be apparent from the following more particular description of preferred apparatus and method steps as illustrated in the accompanying drawings.

DESCRIPTION OF A PREFERRED EMBODIMENT

Figures 1, 2, 3, 4:
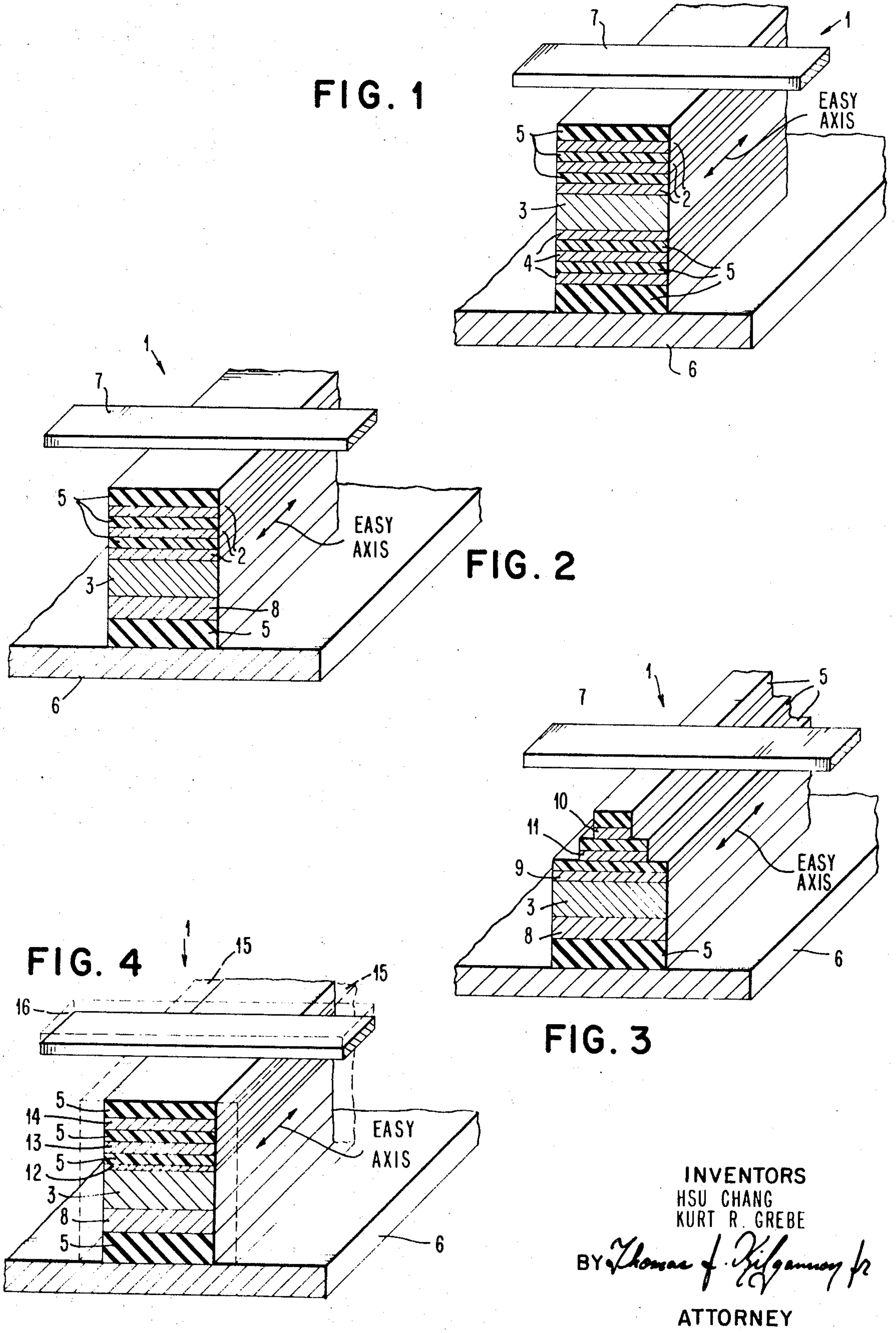
FIG. 1 is a perspective view of a memory element in accordance with the present invention showing a plurality of magnetic thin films disposed symmetrically about a conductor in magnetically coupled relationship with it and with another orthogonally disposed conductor.
FIG. 2 is a perspective view of another embodiment of the present invention similar to that shown in FIG. 1 except that the films on the underside of the conductor are replaced by a single magnetic film of a thickness equal to the sum of the thicknesses of the thin film on the upper side of the conductor.
FIG. 3 is a perspective view of a memory element similar to that shown in FIG. 2 except that the films on the upper side of the conductor are replaced by a plurality of magnetic films each of different width.
FIG. 4 is a perspective view of a memory element similar to that shown in FIG. 2 except that the films on the upper side of the conductor are replaced by a plurality of magnetic films each of different thickness.

Referring now to FIG. 1, a perspective view of a memory element 1 in accordance with the teaching of the present invention is shown. Memory element 1 consists of a number of magnetic films 2 disposed on one side of a conductor 3 symmetrically arranged with an equal number of magnetic films 4 which are positioned on the other side of conductor 3, Each of the magnetic films 2, 4 is spaced one from the other by layers 5 of nonmagnetic material. While layers 5 are nonmagnetic, they may be either conductive or insulating. Magnetic films 2, 4 and layers 5 are all disposed on a conductive substrate 6 which for present purposes serves both as a support for memory element 1 and as a return path for current through conductor 3, for example. Substrate 6 is spaced from the nearest magnetic film 4 by a nonmagnetic layer 5.

Another conductor 7 in FIG. 1 is shown disposed orthogonally relative to conductor 3. Conductor 7 is spaced from the nearest magnetic film 2 by a nonmagnetic layer 5. Each of the conductors 3, 7, when conducting currents from sources, not shown, provides magnetic fields to each of the magnetic films 2, 4. Each film 2 is associated with a correspondingly positioned film 4 and, in FIG. 1, the pair of films 2, 4 closest to conductor 3 form a coupled film, that is, a magnetic circuit in which the magnetic lines of force form a closed path. In like manner, the films 2, 4 furthest from conductor 3 also form a coupled film. Coupled films per se are well known to those skilled in the magnetic film memory art. The usual coupled film is fabricated so that it has an easy axis which is either parallel to the longitudinal axis of conductor 3 or perpendicular to the longitudinal axis of conductor 3. The former is characterized as a CEA (closed easy axis) film. The orientation of the easy axis, as is well know, is established during fabrication by forming a magnetic film by evaporation of an appropriate magnetic material, for example, in an orienting magnetic field. Such films, in response to magnetic fields generated by currents in word and bit conductors, have their magnetization vectors first rotated into the hard direction by the hard direction field, and then tilted into one direction or other parallel to the easy axis by easy direction field during the decay of the hard direction field. Thus, the memory element 1 of FIG. 1 consists of a number of stacked uniaxial films each of which is subjected to rotational switching by the application of appropriate current pulses to orthogonally disposed conductors. From an operational point of view, it makes no difference whether the memory element 1 is CHA or CEA. In FIG. 1 and in the other FIGS. which show different embodiments, the memory elements utilized are CHA, that is, the easy axis is aligned parallel to the longitudinal axis of conductor 3. In this sort of configuration, conductor 3 is a word line, while conductor 7 is a bit-sense line. In a CEA arrangement, the easy axis would be aligned perpendicular to the longitudinal axis of conductor 3. Under such circumstances, conductor 3 would be the bit-sense line, while conductor 7 would be the word line.

In a CHA arrangement of memory element 1 in FIG. 1, the easy axis is shown parallel to the longitudinal axis of word line or conductor 3. Each of the magnetic films 2, 4 is of the same thickness in FIG. 1, but each pair of magnetic films differs in magnetic characteristics from every other pair of magnetic films. Thus, the film pair consisting of the films 2, 4 closest to conductor 3 may be made of one composition of magnetic materials, Permalloy, while each of the other pairs of films may be made of different amounts of the same constituents. Other materials such as Mo, Co, Cu or Cr may be added which have well-known effects on the magnetic characteristics of magnetic thin films. The object, of course, is to so change the magnetic characteristics of each of the pairs of films 2, 4 that they will each be switched by different levels of magnetic field. Suffice it to say, that each pair of films 2, 4 in the memory element of FIG. 1 differs from the other pairs of films in their composition or fabrication condition and, because of this, each pair of films can be switched to store separate pieces of information in each pair of films. This will become evident in what follows when the method of switching a stacked film memory element is discussed.

Referring now to FIG. 2, there is shown a perspective view of a memory element 1, which is similar in every detail to the device of FIG. 1 except that magnetic films 4 have been lumped into a single magnetic film 8 which is equal in cross-sectional area to the sum of the cross-sectional area of magnetic films 4. In the arrangement of FIG. 2, conductor 7 which is also characterized as a bit-sense line is used both during writing into and reading from the films. Because the magnetic flux lines of the upper magnetic films 2 are tightly linked with conductor 3, it is sufficient to detect the signals resulting from the switching of the magnetic films from only the top layers of magnetic films 2. The bottom magnetic films 4 of FIG. 1 are combined into magnetic layer 8 in FIG. 2. The purpose of the film 8 is to provide flux closure for each of the magnetic films 2 when a pulse is applied to word line or conductor 3.

In FIG. 3, a memory element 1 is shown which is similar to that shown in FIG. 2 except that magnetic films 2 are replaced by magnetic films 9, 10, 11 each of the same composition of magnetic material but of different widths. For greater flexibility and control, there is, of course, no reason why the composition or fabrication condition of the magnetic material of each of the films 9, 10, 11 cannot be different. Magnetic film 8 in FIG. 3 has a cross-sectional area which is equal to the sum of the cross-sectional areas of magnetic films 9, 10, 11. The variation in width and/or composition causes each of the films to be responsive to different values of flux so that each film can store discrete bits of binary information. This will become apparent when the method of operating multibit memory elements is discussed below.

In another embodiment shown in FIG. 4, the structure is similar to that shown in FIG. 2 except that films 2 are replaced by magnetic films 12, 13, 14 each of which differs in thickness from the others. By adjusting the thickness of the films 12, 13, 14, each consisting of the same composition of magnetic material, each film responds to different levels of magnetic field and, a plurality of bits of binary information is stored at a single physical location which is defined by the intersection of orthogonally disposed conductors 3 and 7. As with the other embodiments, the compositions or fabrication conditions of each of the magnetic films 12, 13, 14 may be different thereby providing a greater degree of flexibility and control.

In the foregoing, a number of embodiments have been shown which show only the relationship of the various films, easy axis and conductors to form CHA memory elements. It should be appreciated that the arrangements shown are not intended to be illustrative. Other modifications such as the provision of a portion of magnetic material to form a low reluctance path between the edges of the upper and lower magnetic film may be utilized to achieve improved operation of the memory elements 1. In FIG. 4, for example, magnetic portions 15 shown in dotted lines interconnect the edges of films 12, 13 and 14 with magnetic film 8 thereby forming a low reluctance magnetic circuit free of air gaps.

It has already been indicated that it is a matter of choice whether CHA or CEA memory elements are used. FIGS. 1—4 have been shown as CHA memory elements for illustrative purposes. Where CEA arrangements are desired, that is, where the easy axis of the magnetic films is perpendicular to the direction of the easy axis shown in FIG. 4, a layer of magnetic material 16 is usually provided which is disposed in overlying relationship with conductor 7. In the CEA arrangements, conductor 7 is the word line to which a current pulse is applied to switch the magnetic orientation of the films 12, 13, 14 into the hard direction. Magnetic layer 16 commonly called a keeper is shown in dotted lines in FIG. 4 and, it is used to confine the magnetic field resulting from a pulse applied to conductor 7 to the magnetic films (8, 12, 13, 14) immediately underneath it. Magnetic losses are reduced significantly and magnetostatic coupling is improved. It should be appreciated that layer 16 has equal utility with CHA arrangements and is usually incorporated in the CHA embodiments of FIGS. 1—4.

Figure 5A:
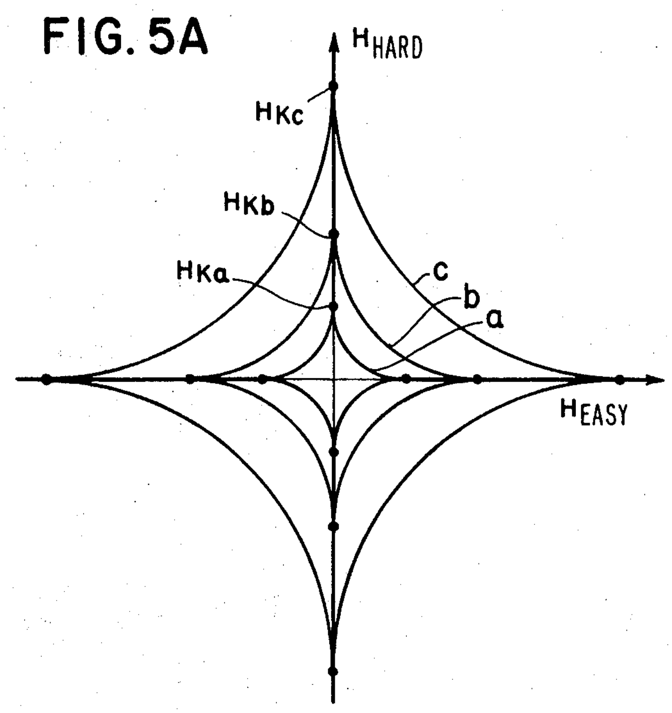
FIG. 5A shows the rotational threshold switching curves for each of a plurality of stacked magnetic films of the types shown in FIGS. 1—4. Each threshold curve represents the limit of the field vector tolerable by a film without altering irreversibly its storage state.
Figure 5B:
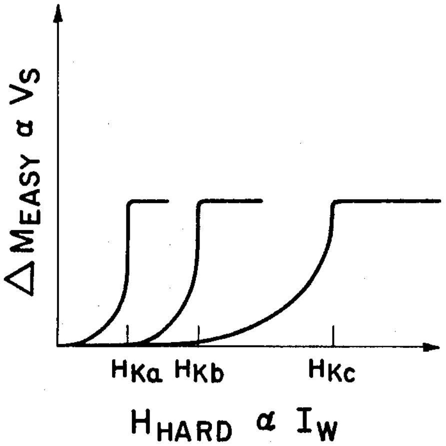
FIG. 5B shows a plot of the easy direction magnetization change ($\Delta M_{easy}$) from an initial quiescent value as a function of hard direction field ($H_{hard}$) for each of a plurality of stacked magnetic films of the types shown in FIGS. 1—4.

Referring now to FIG. 5A, the rotational threshold curves or the astroidal curves for a memory element containing three pairs of magnetic films are shown. The switching behavior of the pairs of magnetic films can be understood from a consideration of this FIG. The preferred magnetization direction, i.e., the easy axis of the films, which is present due to uniaxial magnetic anisotropy in the films is shown as $H_{easy}$in FIG. 5A. The direction perpendicular to the easy axis, i.e. the hard axis, is shown as $H_{hard}$ in FIG. 5A. The rotational switching (or critical) curves having four portions enclosing given areas forming astroids define the minimum limits of externally applied magnetic fields required to reverse irreversibly by rotation the magnetic state of each of the pairs of magnetic films. A magnetic field or a combination of magnetic fields having a resultant magnitude falling without the astroids irreversibly switches the films by a fast rotational process. Thus, for a magnetic film pair having a critical switching curve *a* in FIG. 5A, a resultant field which is greater than the limits defined by the astroid boundaries is required to irreversibly switch its associated magnetic film. Astroids *b* and *c*, in like manner, define the combination of magnetic fields required to irreversibly switch their associated films. In FIG. 5A, the anisotropy field or saturation magnetization force in the hard direction (commonly referred to as $H_k$) is indicated as $H_{ka}$, $H_{kb}$ and $H_{kc}$ for asteriods *a*, *b* and *c*, respectively. The successive layers of uniaxial films of FIG. 1 have successively higher anisotropy fields which result from differences in either the composition or physical characteristics of the layers. From FIG. 5A then, it should be clear that where the anisotropy fields of two successive layers are sufficiently different, a combination of fields may be applied which completely switches a film having a low anisotropy field but does not switch a film having a higher anisotropy field. Thus, in FIG. 5A, a combination of fields may be applied which falls outside the limits of asteroid *a* completely switching its associated film of anisotropy field $H_{ka}$ but leaving the film associated with asteroid *b* of anisotropy $H_{kb}$ essentially undisturbed or unswitched. FIG. 5B shows a plot of the easy direction magnetization change ($\Delta M_{easy}$) from an initial quiescent value as a function of hard direction field ($H_{hard}$) for each of a plurality of stacked films, the rotational threshold switching curves of which are shown in FIG. 5A. As indicated in connection with FIG. 5A, the successive layers of uniaxial films have successively higher anisotropy fields, $H_{ka}$, $H_{kb}$, $H_{kc}$. Note in FIG. 5B, that to the first order, the easy direction magnetization change ($\Delta M_{easy}$) is proportional to sense voltage ($V_s$) and the hard direction field ($H_{hard}$) is proportional to the word current ($I_w$). From a consideration of FIG. 5B, it should be apparent that when the anisotropy fields of two successive layers are sufficiently different, an intermediate field may switch the lower anisotropy film completely but disturb the higher anisotropy film only imperceptibly.

While the discussion hereinabove has dealt primarily with uniaxial film, it should be appreciated that the memory elements of the present invention operate equally well with other types of films such as biaxial films. As a matter of fact, using biaxial films, it can be expected that the anisotropy field values of a film relative to the succeeding and preceding films can be precisely adjusted so that only small changes in the value of anisotropy field ($H_k$) gives extremely rapid switching without affecting adjacent magnetic films.

Figures 6A, 6B:
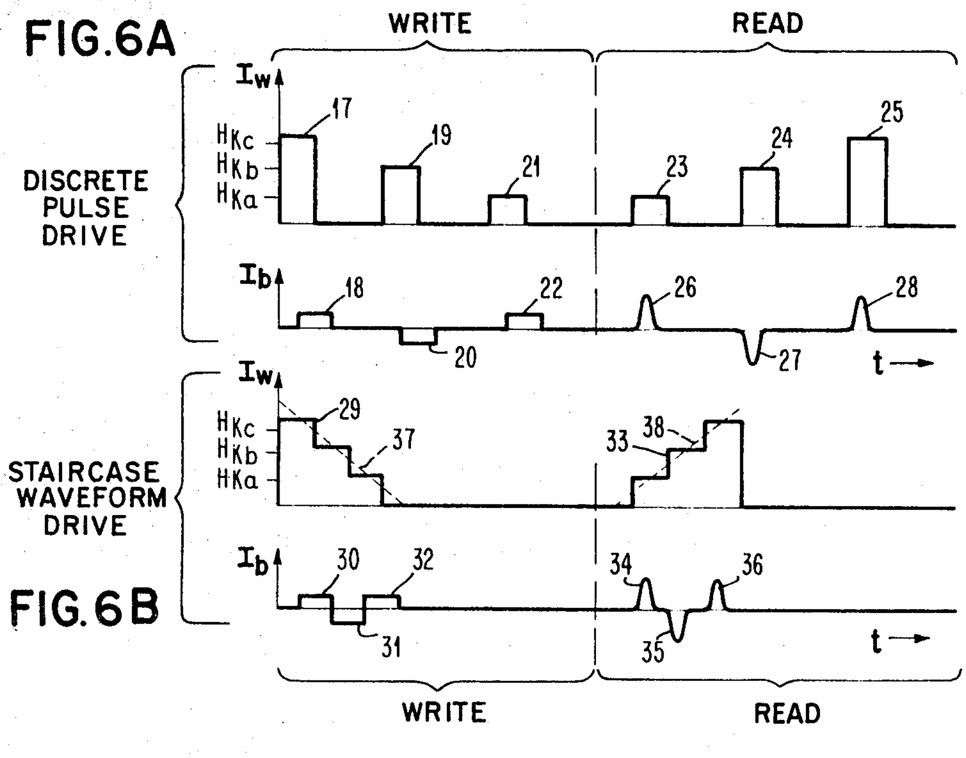
FIG. 6A shows the pulse patterns applied to activate stacked film memory elements during both write and read cycles using discrete pulses.
FIG. 6B shows staircase or step-shaped pulse patterns applied to activate stacked film memory elements during both write and read cycles. Sawtooth pulse patterns are also shown in dotted lines in FIG. 6B for both write and read cycles.

Referring now to FIGS. 6A and 6B, pulse patterns for both write and read cycles for a stacked film memory elements are shown. Assume, for purposes of illustration, that any of the memory elements 1 of FIGS. 1—4 is selected and that pulsed sources are connected to conductor or word line 3 and to conductor or bit-sense line 7. Since each of the embodiments of FIGS. 1—4 includes three switchable films, it can also be assumed that a representative memory element 1 has three films having anisotropy fields of $H_{ka}$, $H_{kb}$ and $H_{kc}$ which respond to different levels of magnetic field. In FIG. 6A, the amplitude of the word ($I_w$) is plotted with respect to time for both write and read cycles. Since $I_w$ is proportional to anisotrophy field, currents equivalent to $H_{ka}$, $H_{kb}$ and $H_{kc}$ have been indicated on the $I_w$ axis to relate these parameters in FIGS. 6A and 6B to the anisotropy fields shown in FIGS. 5A and 5B. The amplitude of the bit current $I_b$ with respect to time is also shown in FIG. 6A. Where discrete pulses are used, such as shown in FIG. 6A, for writing information into the films, a pulse 17 of amplitude in excess of $H_{ka}$ is applied to word line 3 of memory element 1 of FIG. 4, for example, from a pulse source not shown. Current through word line 3, sets up a magnetic field perpendicular to the easy axis of memory switching the memory element 1 into the hard direction.

Applying current pulse 17 in excess of $H_{kc}$ affects all the films 12, 13, 14 by switching each into the hard direction. The application of a bit pulse from a pulse source (not shown) via bit line 7, applies a magnetic field parallel to the easy axis of memory element 1 in one direction or the other depending on the polarity of the applied bit pulse and all the films 12, 13, 14 are rotated into either a binary "one" or "zero" condition. Pulse 18 is positive so it can be assumed that all the films of memory element 1 are switched into a binary "one" condition. At some later time, a current pulse 19 is applied to word line 3 of amplitude in excess of $H_{kb}$ and, in conjunction with a bit current pulse 20 of negative polarity applied via bit line 7, magnetic films 12, 13 are rotated into a binary "zero" condition. At a still later time, a current pulse 21 of amplitude in excess of $H_{ka}$ is applied to word line 3 and in conjunction with a bit current pulse 22 of positive polarity applied via bit line 7, magnetic film 12 is rotated into a binary "one" condition. Thus, it is seen that to write information into a memory element 1, pulses of decreasing amplitude are applied simultaneously with pulses of positive or negative polarity via orthogonally disposed conductors to create coincident fields at the storage films. The decreasing amplitude of the pulses on the word line results from the recognition that if the anisotropy field of a given film is not exceeded once it has been permanently set, the film cannot be affected by pulses of amplitude which corresponds to a lower anisotropy field.

To accomplish readout of stored information from the memory element 1 of FIG. 4, pulses of increasing amplitude 23, 24, 25 corresponding to anisotropy fields in excess of $H_{ka}$, $H_{kb}$ and $H_{kc}$, respectively are applied via word line 3, causing each of the films 12, 13, 14 to be successively switched into the hard direction of memory element 1. The change in flux, in one direction or the other, depending on the binary state of each film induces a voltage of positive or negative polarity in conductor 7 which, during a read cycle, can be connected to a sense amplifier (not shown). In FIG. 6A, the application of pulses 23, 24, 25 produces output pulses 26, 27, 28 respectively, from films 12, 13, 14, respectively. Output pulse 27 is of negative polarity because the direction of flux change was opposite to the direction of flux change which resulted in output pulses 26 and 28. Output pulses 26, 27, 28 have the same polarities as pulses 18, 20, 22, respectively, and represent the same information as was originally stored.

Referring now to FIG. 6B, write and read cycles using staircase waveforms or, alternatively, sawtooth waveforms are shown which store information in the same manner as described above in connection with the discussion of discrete pulses. Rather than applying discrete pulses which are spaced apart in time, it is possible to apply a staircase pulse which either descends or ascends to definite amplitude levels and remains there while bit current pulses of appropriate polarity are applied to successively switch each of the magnetic films of a memory element. Thus, in FIG. 6B, staircase waveform 29 having levels $H_{ka}$, $H_{kb}$ and $H_{kc}$, applied via word line 3 in FIG. 4 simultaneously with successive pulses 30, 31, 32 applied via bit line 7 in FIG. 4 accomplishes the same result as the discrete pulses described in connection with FIG. 6A.

In the same vein, readout may be accomplished using the ascending staircase waveform 33 shown in FIG. 6B to produce the output pulses 34, 35, 36 in a sense amplifier (not shown). Using the staircase waveforms, both writing and reading can be accomplished in a significantly shorter time.

A simplification of the pulse generator requirements can be achieved by applying an ascending sawtooth pulse 37 during writing and an ascending sawtooth pulse 38 during readout to word line 3. The amplitude of the sawtooth pulse should be in excess of the anisotropy field for each magnetic film during the time a bit pulse is applied which successively switches each film. Sawtooth pulses 37, 38 are shown in dotted lines in FIG. 6B.

Figure 7:
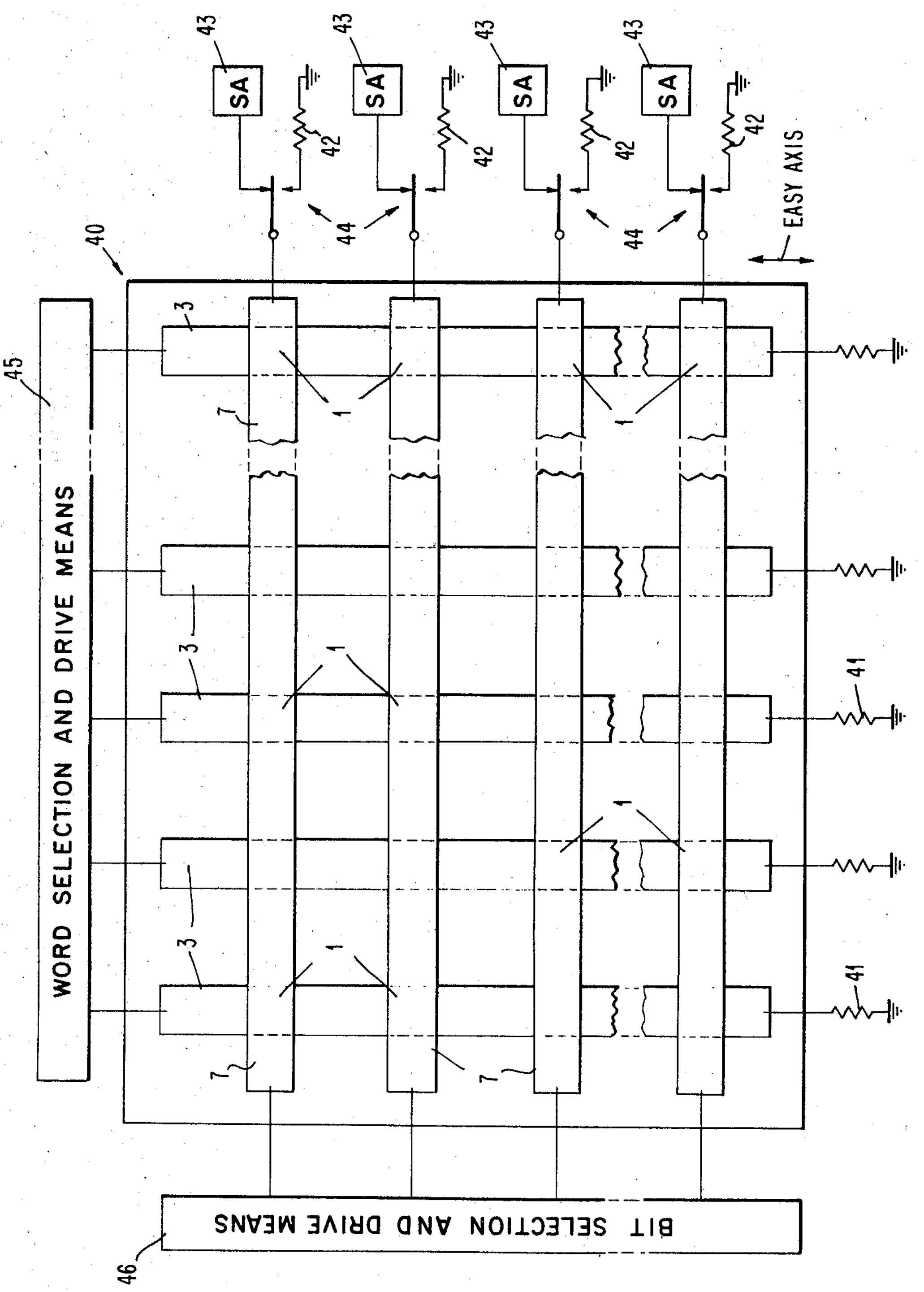
FIG. 7 shows a schematic diagram of an array of stacked film memory elements which provides a high bit density compared with prior art arrangements.

Referring now to FIG. 7, there is shown schematically an array 40 of memory elements 1 which are defined by the intersection of orthogonally disposed word lines 3 and bit-sense lines 7. Word lines 3 are terminated by impedances 41 while bit-sense lines 7 are terminated during a writing cycle in impedances 42 and during a read cycle in sense amplifiers 43. The interconnections are made during the read and write cycles by actuable switches shown schematically at 44 in FIG. 7. Memory elements 1 and conductors 3, 7 are supported on conductive substrate 6. The waveforms necessary to carry out the write and read functions are supplied from word and bit selection and drive means shown in blocks 45, and 46, respectively in FIG. 7. Word and bit selection and drive means 45, 46, respectively may be any suitable means for applying the waveforms or pulses of FIGS. 6A and 6B to store information in memory element 1. Array 40 is word organized. Thus, at any given instant, word selection and drive means 45 selects, for example, the leftmost of word lines 3 and supplies a staircase waveform from a waveform generator which forms a part of means 45 similar to waveform 29 in FIG. 6B. Assuming that each of the memory elements 1 consists of three stacked magnetic films, information is stored in each of the films upon the application of pulses similar to those shown at 30, 31, 32 in FIG. 6B to each of the bit lines 7 from bit selection and drive means 46. Means 46 includes pulse generators which are appropriately triggered from a register or the like! Thus, all the memory element 1 associated with the leftmost word line 3 and the lowest bit-sense line 7, when subjected to the write pulses shown in FIG. 6B, store a binary "one", a binary "zero" and a binary "one" in the three magnetic films which make up the memory element 1. Each of the other sites on the leftmost word line can store three bits of information when subjected to proper write pulses in the corresponding bit line.

To read out the information means 45 selects the leftmost word line 3 and applied thereto the staircase waveform 33 of FIG. 6B to provide output pulses 34, 35, 36 to each of sense amplifiers 43 via switches 44.

Using memory array 40, it is seen that multiple bits of information can be stored at a single bit-line word-line intersection without increasing the areal dimensions of the array over the array which stores only one bit per word-line bit-line intersection. This is accomplished by time sharing the word lines and the bit lines.

While the fabrication of memory array 40 of FIG. 7 form no part of the novelty of the present invention, it should be appreciated that such arrays can be fabricated using techniques well known to those skilled in magnetic memory art. Thus, the magnetic films 2, 4, the nonmagnetic layers 5, and conductors 3, 7 which form memory elements 1 may be fabricated by the deposition of layers of the different materials by evaporation, by marking and etching in a well-known manner which incorporates photolithograph techniques and the like.

In one exemplary technique, the different layers of the element 1 of FIGS. 1—4 may be formed by evaporation and etching techniques. For example, using conventional evaporation apparatus, boats containing nickel, iron, cobalt, a dielectric and copper are heated to provide layers of a single material or layers containing any combination of the above-mentioned materials. This can be accomplished by appropriately shuttering the sources. A substrate is provided on which the dielectric or nonmagnetic material is deposited. Then, in the following sequence, alternating layers of magnetic material and nonmagnetic material are deposited. A layer of copper is then deposited followed by the deposition of alternating layers of magnetic material and nonmagnetic material. Finally, a layer of insulating material or nonmagnetic material is deposited. If the depositions have not been accomplished through masks which permit deposition only in selected areas, etching of each of the layers must be accomplished to delineate the deposited layers into discrete films and conductors. After such delineation, strips of copper are deposited orthogonally relative to the etched magnetic films and copper conductors.

To properly practice the present invention, magnetic films either biaxial or uniaxial with the lowest $H_k$ are disposed furthest away from the word or bit conductor, as the case may be, while the higher $H_k$ magnetic films are disposed closest to the conductor. Thus, in depositing the magnetic films of Permalloy (80 percent Ni, 20 percent Fe), the film adjacent to the ground plane contains the lowest amount of cobalt. For each succeeding magnetic film, the content of cobalt is increased until the copper conductor is deposited. Thereafter, the next magnetic film contains the same amount of cobalt as the last magnetic film and decreases in amount until the last film is deposited. Where a single layer of magnetic material equal in cross-sectional area to the plurality of magnetic films is deposited as in FIG. 2, the single layer can be of Permalloy.

The magnetic memory elements described hereinabove formed into an array such as shown in FIG. 7 provide certain definite advantages as far as the ultimate data rate achievable and the ultimate density of memory elements achievable from the point of view of reducing attenuation.

With respect to ultimate data rate, the data rate per sense channel is the reciprocal of the product of cycle time and the number of parallel sense channels. The access and cycle times result not only from the switching time of the memory elements, but also from the transmission delays and circuitry delays. For film memories, the switching time is limited by the available rise time of practical circuits, rather than by its intrinsic speed. In the arrangements of the present invention, it is possible to space the steps in the word current such that the sense voltages of the successive layers (or bits) follow each other closely just short of overlapping. Thus, the full length of the sense line is usefully occupied by sense signals in transit. If the sense circuits are capable of fast successive detections, the effective transmission delay per bit of information is practically nil.

A major circuitry delay in film memories is the sense circuit recovery time in the destructive readout (DRO) regime. It results from the fact that the power contained in the rewrite bit current exceeds the sense signal power by orders of magnitude, and saturates the sense amplifier. Using the present arrangements of FIG. 7, rewrite can take place for a plurality of bits of a memory element 1 at the same time, and the sense amplifier is only saturated once. Thus, the recovery time per bit is greatly reduced.

For the above reasons, the present device is potentially capable of maximum data rate per sense channel. Of course, higher data rate is also obtainable with parallel operation of lines or memory modules. The present invention can increase the data rate per sense channel by orders of magnitude, especially in large memories, and can further avail itself of the parallel operation of lines and memory modules.

High density is being pursued for many reasons but will be considered hereinbelow only from the point of view of how density is affected by attenuation and vice versa. It can be shown by a dimensional analysis that with miniaturization in the planar dimensions, the attenuation per bit varies according to $D$ and the signal-to-thermal noise ratio varies according to $D^{1.5}$, where $D$ is a linear dimension of the device or array. It is obvious that before signal-to-noise ratio is decreased below the level for reliable detection, miniaturization is a good strategy to follow in order to decrease attenuation per bit. However, below the level for reliable detection, other schemes must be evolved. One such approach is the approach of the present invention. With $N$ films in a memory element, the attenuation per bit is reduced by a factor of $N$ for the same planar dimensions.

In addition to the above-described advantages, other advantages are the sharing of word and bit drivers, as well as sense amplifiers, and the reduction of the number of interconnections when the memory elements of the present interconnections when the memory elements of the present invention are fabricated in array form.

While the invention has been particularly shown and described with reference to preferred embodiments and method steps, it will be appreciated by those skilled in the art that the foregoing and other changes in form and details may be made therein without departing from the spirit and scope of the invention.

We claim:

1. A method for writing into multibit, multifilm magnetic storage element comprising the steps of applying via orthogonally disposed conductors at least a pulse of decreasing amplitude and simultaneously applying a train of pulses each of positive or negative polarity during the first of which rotation of all the films of the multibit element occurs, each succeeding pulse rotating one less film than the preceding pulse.

2. A method according to claim 1 wherein said at least a pulse of decreasing amplitude is a sawtooth-shaped pulse.

3. A method according to claim 1 wherein said at least a pulse of decreasing amplitude is a step-shaped pulse.

4. A method according to claim 1 wherein said at least a pulse of decreasing amplitude is a train of decreasing amplitude pulses.

5. A method according to claim 1 further including the step: applying via one of said orthogonally disposed conductors at least a pulse of increasing amplitude to switch each of said films of said storage elements to successively induce a current representative of the storage state of each of said films in the other of said conductors.

6. A method according to claim 5 wherein said at least a pulse of increasing amplitude is a sawtooth-shaped pulse.

7. A method according to claim 5 wherein said at least a pulse of increasing amplitude is a step-shaped pulse.

8. A method according to claim 5 wherein said at least a pulse of increasing amplitude is a train of increasing amplitude pulses.

9. A method for reading stored information from a multibit, multifilm magnetic storage element comprising the step of applying via one of a pair of orthogonally disposed conductors which are magnetically coupled to said storage element at least a pulse of increasing energy content to switch each of the films of said storage element in turn to induce successive signals in the other of said pair of conductors which are indicative of the binary state of each of the films of said storage element.

10. A method according to claim 9 wherein said at least a pulse of increasing energy content is a sawtooth-shaped pulse.

11. A method according to claim 9 wherein said at least a pulse of increasing energy content is a step-shaped pulse.

12. A method according to claim 9 wherein said at least a pulse of increasing energy content is a train of increasing amplitude pulses.

13. A method according to claim 9 further including the step of applying at least a pulse of decreasing energy content to said one of said pair of conductors while simultaneously applying a train of pulses containing pulses of positive or negative polarity to said other of said pair of conductors, all of said films of said memory element being rotated during the application of the first of said train of pulses, one less film being rotated during the application of a succeeding pulse than during the application of a preceding pulse.

14. A memory element comprising a first conductor, a second conductor disposed orthogonal thereto, means disposed at the intersection of said first and second conductors for storing a plurality of discrete bits of information, means for applying at least a pulse of changing amplitude coupled to one of said first and second conductors during both a read and write cycle, and means for applying a train of discrete pulses coupled to the other of said first and second conductors during said write cycle.

15. A memory element according to claim 14 further including means coupled to the other of said first and second conductors during said read cycle responsive to the presence of currents in the other of said conductors.

16. A structure according to claim 14 further including means for closing flux disposed adjacent one of said conductors.

17. A structure according to claim 16 wherein said means for closing the flux includes magnetic films connecting the edges of said films.

18. A structure according to claim 16 wherein said means for closing flux is a magnetic keeper.

19. A memory element according to claim 14 wherein said means for storing a plurality of discrete bits of information includes a plurality of magnetic films disposed in magnetically coupled relationship with said conductors.

20. A memory element according to claim 19 wherein each of said plurality of films differs from the others by a difference in a physical characteristic.

21. A memory element according to claim 19 wherein each of said plurality of films differs from the others by a difference in a magnetic characteristic.

22. A memory element according to claim 19 wherein said plurality of magnetic films includes a plurality of pairs of magnetic films disposed symmetrically about one of said first and second conductors.

23. A memory element according to claim 19 wherein said plurality of magnetic films includes a plurality of magnetic films disposed adjacent one of said first and second conductors and a single magnetic film of a cross-sectional area at least equal to the cross-sectional area of said plurality of magnetic films disposed opposite said plurality of magnetic films.

24. A memory element according to claim 23 wherein each of said plurality of magnetic films and said single magnetic film have different cross-sectional areas.

25. A structure according to claim 19 wherein said plurality of magnetic films are uniaxial magnetic films.

26. A structure according to claim 19 wherein said plurality of magnetic film are biaxial magnetic films.

27. A structure according to claim 19 further including means for closing the flux disposed adjacent said word conductor and opposite said magnetic films.

28. A structure according to claim 19 further including means for closing the flux disposed adjacent said word conductor and spaced from said magnetic films.